US012277717B2

(12) United States Patent
Zhou et al.

(10) Patent No.: US 12,277,717 B2
(45) Date of Patent: Apr. 15, 2025

(54) OBJECT DETECTION METHOD AND SYSTEM, AND NON-TRANSITORY COMPUTER-READABLE MEDIUM

(71) Applicant: GUANGDONG OPPO MOBILE TELECOMMUNICATIONS CORP., LTD., Guangdong (CN)

(72) Inventors: Yang Zhou, Palo Alto, CA (US); Jie Liu, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 435 days.

(21) Appl. No.: 17/735,742

(22) Filed: May 3, 2022

(65) Prior Publication Data

US 2022/0262093 A1 Aug. 18, 2022

Related U.S. Application Data

(63) Continuation of application No. PCT/CN2020/130243, filed on Nov. 19, 2020.

(Continued)

(51) Int. Cl.
*G06T 7/246* (2017.01)
*G06V 10/20* (2022.01)
(Continued)

(52) U.S. Cl.
CPC ............ *G06T 7/251* (2017.01); *G06V 10/255* (2022.01); *G06V 10/766* (2022.01); *G06V 10/7715* (2022.01); *G06V 10/82* (2022.01); *G06V 40/113* (2022.01); *G06V 40/167* (2022.01); *G06V 10/454* (2022.01); *G06V 10/62* (2022.01); *G06V 20/64* (2022.01)

(58) Field of Classification Search
None
See application file for complete search history.

(56) References Cited

U.S. PATENT DOCUMENTS 9,946,960 B1 * 4/2018 Kim ................... G06N 3/045
10,725,438 B1 * 7/2020 Marsousi ............ G06V 10/25
(Continued)

FOREIGN PATENT DOCUMENTS

CN 105844669 8/2016
CN 108073929 5/2018
(Continued)

OTHER PUBLICATIONS

WIPO, International Search Report and Written Opinion for International Application No. PCT/CN2020/130243, Jan. 28, 2021.
(Continued)

*Primary Examiner* — Soo Shin
(74) *Attorney, Agent, or Firm* — Hodgson Russ LLP

(57) ABSTRACT

The embodiments of the present disclosure disclose an object detection method and system, and a non-transitory computer-readable medium. In the object detection method, multiple candidate bounding boxes of an interest object in a current image frame are obtained. Based on a determined bounding box of the interest object in a previous image frame, the multiple candidate bounding boxes are filtered to obtain a determined bounding box of the interest object in the current image frame.

18 Claims, 8 Drawing Sheets

Related U.S. Application Data

(60) Provisional application No. 62/938,232, filed on Nov. 20, 2019.

(51) Int. Cl.

| | | |
|---|---|---|
| *G06V 10/44* | (2022.01) | |
| *G06V 10/62* | (2022.01) | |
| *G06V 10/766* | (2022.01) | |
| *G06V 10/77* | (2022.01) | |
| *G06V 10/82* | (2022.01) | |
| *G06V 20/64* | (2022.01) | |
| *G06V 40/10* | (2022.01) | |
| *G06V 40/16* | (2022.01) | |

(56) References Cited

U.S. PATENT DOCUMENTS

| | | | |
|---|---|---|---|
| 2005/0216274 A1 | 9/2005 | Kim | |
| 2011/0255743 A1* | 10/2011 | Guan | G06V 20/582 |
| | | | 382/103 |
| 2015/0170002 A1* | 6/2015 | Szegedy | G06V 30/194 |
| | | | 382/156 |
| 2016/0275678 A1* | 9/2016 | Onal | G06V 10/50 |
| 2017/0124409 A1* | 5/2017 | Choi | G06V 10/25 |
| 2018/0137647 A1* | 5/2018 | Li | G06T 7/73 |
| 2018/0182088 A1* | 6/2018 | Leordeanu | G06T 7/60 |
| 2019/0171871 A1 | 6/2019 | Zhang et al. | |
| 2021/0026355 A1* | 1/2021 | Chen | G05D 1/0088 |

FOREIGN PATENT DOCUMENTS

| | | |
|---|---|---|
| CN | 108388879 | 8/2018 |
| CN | 110021033 | 7/2019 |

OTHER PUBLICATIONS

EPO, Extended European Search Report for EP Application No. 20891283.2, Dec. 7, 2022.

CNIPA, First Office Action for CN Application No. 202080076325.1, Dec. 10, 2024.

\* cited by examiner

FIG. 6

OBJECT DETECTION METHOD AND SYSTEM, AND NON-TRANSITORY COMPUTER-READABLE MEDIUM

CROSS REFERENCE TO RELATED APPLICATION(S)

This application is a continuation of International Application PCT/CN2020/130243 filed on Nov. 19, 2020. The International Application claims the benefit of U.S. Provisional Application No. 62/938,232, filed on Nov. 20, 2019. The entirety of the above-mentioned applications is hereby incorporated by reference herein.

TECHNICAL FIELD

The present disclosure relates to the field of computer vision technologies, and more particularly, to an object detection method and system, and a non-transitory computer-readable medium.

BACKGROUND

The ability to accurately and efficiently reconstruct the motion of the human hand from images promises exciting new applications in immersive virtual and augmented realities, robotic control, and sign language recognition. There has been great progress in recent years, especially with the arrival of consumer depth cameras. However, it remains a challenging task due to unconstrained global and local pose variations, frequent occlusion, local self-similarity, and a high degree of articulation.

SUMMARY OF THE DISCLOSURE

The disclosure provides an object detection method and system, and a non-transitory computer-readable medium.

Embodiments of the disclosure provide an object detection method. The method includes obtaining a plurality of candidate bounding boxes of an interest object in a current image frame; and filtering the plurality of candidate bounding boxes based on a determined bounding box of the interest object in a previous image frame, to obtain a determined bounding box of the interest object in the current image frame.

Embodiments of the disclosure provide an object detection system. The system includes a processor and a memory; wherein the memory stores at least one instruction, and the instruction is loaded and executed by the processor to perform an object detection method, the object detection method comprises: obtaining a current image frame including an interest object, and extracting a backbone feature map of the interest object in the current image frame; obtaining a plurality of candidate bounding boxes of the interest object in the current image frame, based on the backbone feature map; and filtering the plurality of candidate bounding boxes based on a determined bounding box of the interest object in a previous image frame, to obtain a determined bounding box of the interest object in the current image frame.

Embodiments of the disclosure provide non-transitory computer-readable medium storing instructions thereon. The instructions, when being executed by a processor, cause the processor to implement an object detection method. In the method, a backbone feature map is extracted from an acquired current image frame including an interest object. Multiple candidate bounding boxes of the interest object in the current image frame are obtained based on the backbone feature map. The multiple candidate bounding boxes are filtered based on a determined bounding box of the interest object in a previous image frame, to obtain a determined bounding box of the interest object in the current image frame.

BRIEF DESCRIPTION OF THE DRAWINGS

In order to more clearly describe the technical solutions of the disclosure, the following briefly introduces the drawings needed to be used in the description of the embodiments. Obviously, the drawings in the following description only illustrate some embodiments of the disclosure, and other drawings can be obtained for those skilled in the art, based on these drawings without creative work.

FIG. 6 illustrates a schematic confidence mask, or a schematic location and shape mask for filtering candidate bounding boxes, in accordance with an embodiment of present disclosure.

DETAILED DESCRIPTION OF THE DISCLOSURE

Figure 1:
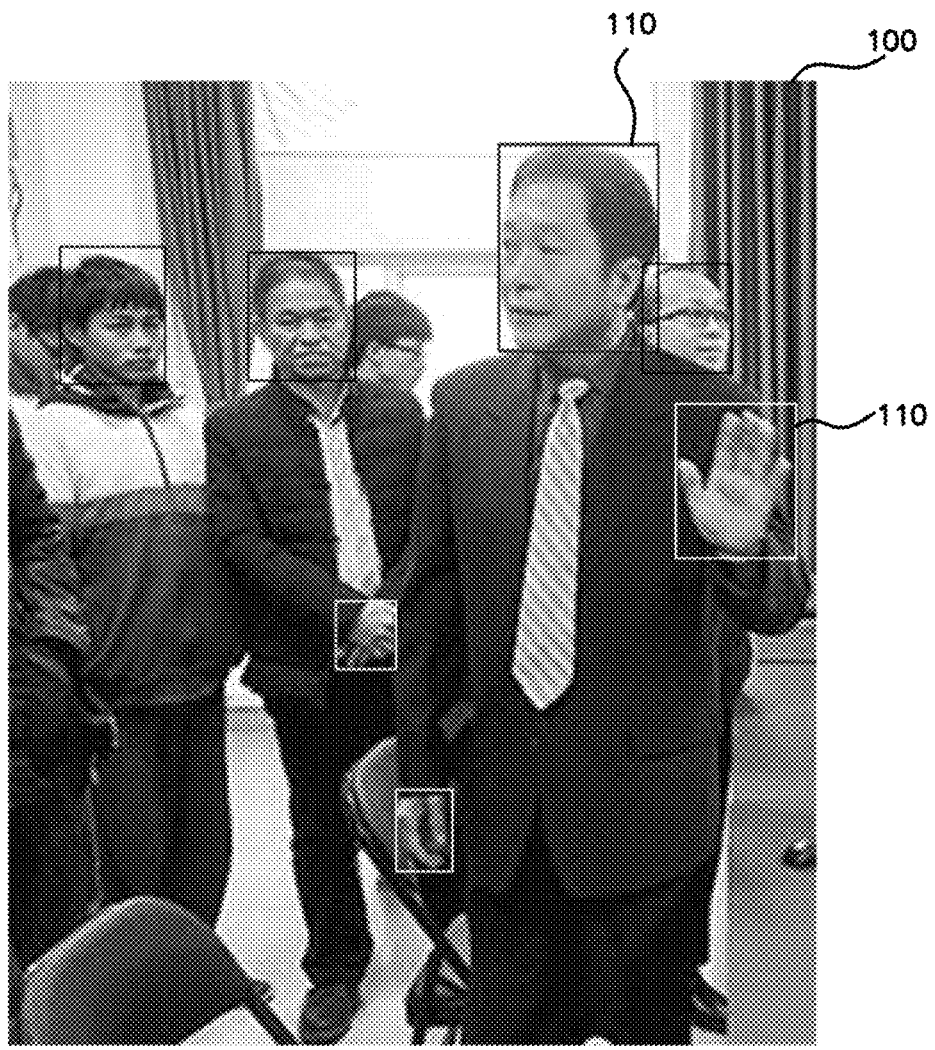
FIG. 1 illustrates a schematic example of an image with bounding boxes, in accordance with an embodiment of present disclosure.

The same reference numerals in the drawings represent the same component, and the principle of the disclosure is illustrated by being implemented in an appropriate computing environment for illustration. The following description is based on the exemplified specific embodiments of the disclosure and should not be regarded as limiting other embodiments that are not illustrated herein.

The principle of the disclosure uses many other computation system, communication environments or configurations, with general purpose or specific purpose, to execute. Well-known examples of computing systems, environments, and configurations suitable for use in this disclosure may include (but are not limited to) handheld phones, personal computers, servers, multi-processor systems, microcomputer-based systems, main architecture computers, and distributed computing environments which include any of the above systems or devices.

Details will be described below.

Embodiments described herein relate to machine-learning models that enable computing devices (e.g., electronic devices such as smartphones, tablets, and laptops) to recognize objects and features of objects captured in images or videos. Embodiments of the disclosure provide an object detection device. The object detection device includes a backbone feature extractor, a bounding box detection head, and a bounding box selection head. The backbone feature extractor is configured to obtain a current image frame including an interest object, and output an extracting result. The bounding box detection head is configured to obtain a plurality of candidate bounding boxes of the interest object in the current image frame based on the extracting result. The bounding box selection head is configured to filter the plurality of candidate bounding boxes based on a determined bounding box in a previous image frame, thereby obtaining a determined bounding box of the interest object in the current image frame.

The object detection method, device and system in the embodiments may improve a robustness of bounding box detection for interest object. We leverage the determined bounding box in the previous image frame to constrain the location and shape of the bounding box in the current image frame, leading to more accurate object detection results.

FIG. 1 illustrates an example of an image 100 with bounding boxes 110. In some embodiments, a machine-learning model is trained to process an image, such as image 100, and detect particular objects of interest object in the image. In the example shown, the machine-learning model is trained to recognize features of people, such as hands and face. In some embodiments, the machine-learning model may output a bounding box 110 that surrounds a detected instance of an object type, such as hands and face of a person. A rectangular bounding box may be represented as four two-dimensional coordinates that indicate the four corners of the box.

A time-of-flight camera (TOF camera) may be employed, in the electronic device that performs the object pose detection methods, to capture the image or video. The TOF camera is a range imaging camera system that employs time-of-flight techniques to resolve distance between the camera and the subject for each point of the image, by measuring the round trip time of an artificial light signal provided by a laser or an LED.

Figure 2:
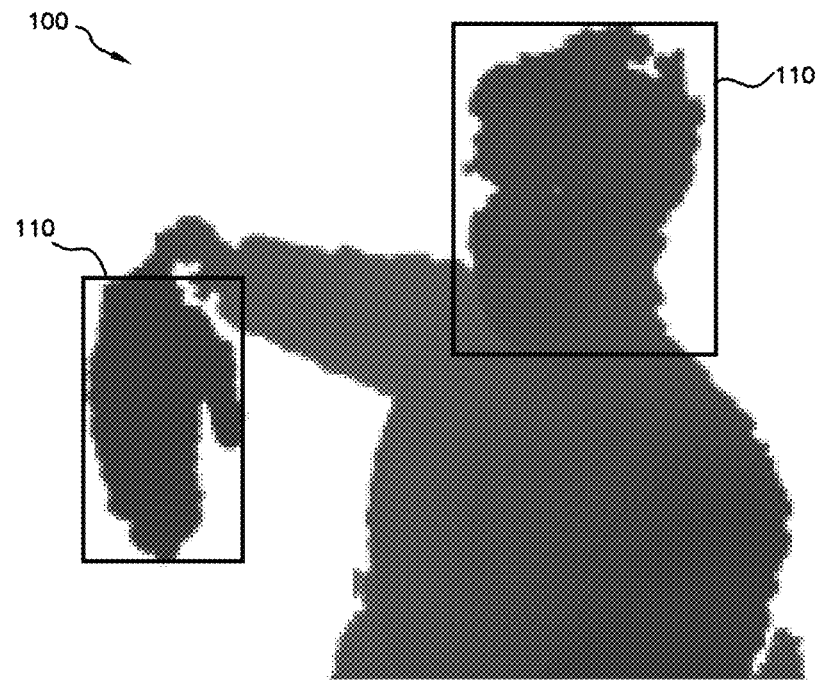
FIG. 2 illustrates a schematic example of a depth image with bounding boxes, which is captured by a time-of-light camera, in accordance with an embodiment of present disclosure.
Figure 3:
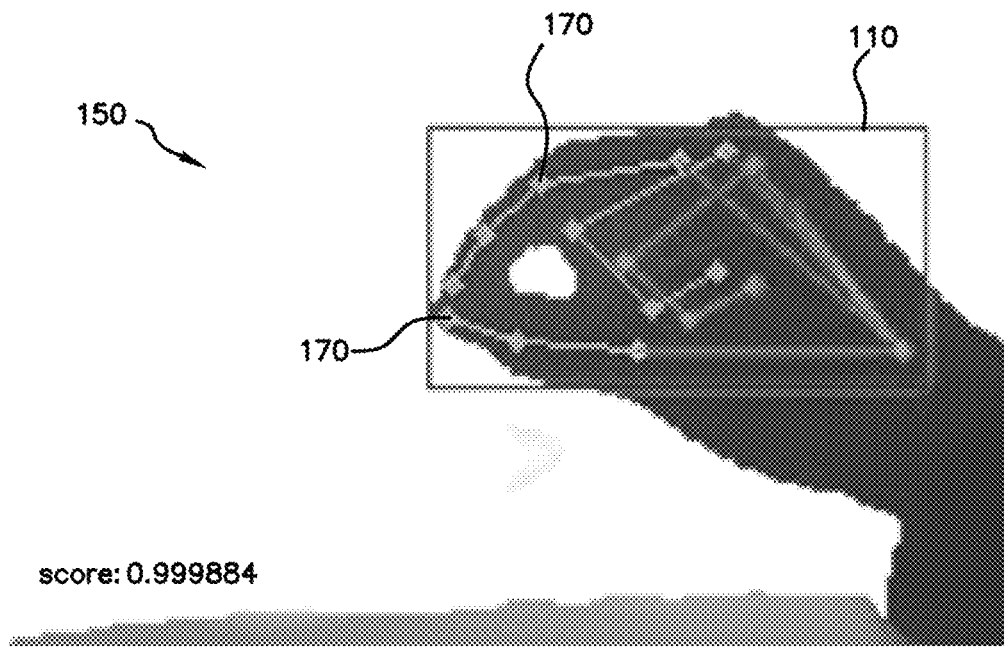
FIG. 3 illustrates a schematic example of an image of a hand detection with structural keypoints, in accordance with an embodiment of present disclosure.

The TOF camera outputs an image of size (height×width, H×W), each pixel value on the 2D image represents the depth value of the object (i.e., the pixel value ranges from 0 mm to 3,000 mm). An example image captured by the TOF camera is illustrated in FIG. 2. In the following, we regard such image captured by the TOF camera as a depth image. FIG. 3 illustrates an example of an image 150 with structural keypoints 170. The image 150 may be captured by the TOF camera and may be used to represent the pose of a detected hand of a person. In some embodiments, a machine-learning model may additionally or alternatively to detect hand(s) of a person. Hand detection is a process of inputting the depth image, then outputting a probability of hand presence (i.e., a numerical number from 0 to 1, a larger value represents a larger confidence of hand presence), and the hand bounding box 110 (i.e., a bounding box representing the location and size of the hand). In some embodiments, the bounding box 110 is represented as $(x_{min}, y_{min}, x_{max}, y_{max})$, wherein $(x_{min}, y_{min})$ is the left-top corner of the bounding box 110, and $(x_{max}, y_{max})$ is the right-down corner of the bounding box.

In some embodiments, a machine-learning model may additionally or alternatively map keypoints 170 to the detected hand's structure. The keypoints 170 may map to the detected hand's finger joints or phalangeal bones, such as distal phalanges of each finger, middle phalanges of each finger, proximal phalanges of each finger, and metacarpal bones of each finger, or any other joints or structures of interest. In some embodiments, the machine-learning model may be trained to map keypoints to a hands, including wrist, first distal phalanges, first proximal phalanges, first metacarpal bones, second distal phalanges, second middle phalanges, second proximal phalanges, second metacarpal bones, third distal phalanges, third middle phalanges, third proximal phalanges, third metacarpal bones, fourth distal phalanges, fourth middle phalanges, fourth proximal phalanges, fourth metacarpal bones, fifth distal phalanges, fifth middle phalanges, fifth proximal phalanges, and fifth metacarpal bones. In some embodiments, each keypoint 170 may be represented as a two-dimensional coordinate, and the set of keypoints 170 may be represented as an array or vector of coordinates. For example, 20 keypoints 170 may be represented as a vector with 40 entries, such as $[x_1, y_1, \ldots x_{20}, y_{20}]$, where each pair of $(x_i, y_i)$ represents the coordinates of one keypoint i. The order of each coordinate in the vector may implicitly indicate the keypoint 170 to which the coordinate corresponds. For example, it may be predetermined that $(x_1, y_1)$ corresponds to the first distal phalanges, $(x_2, y_2)$ corresponds to the first proximal phalanges, and so on. Although particular data representations for keypoints 170 are described, this disclosure contemplates any suitable data representations of such information.

Figure 4:
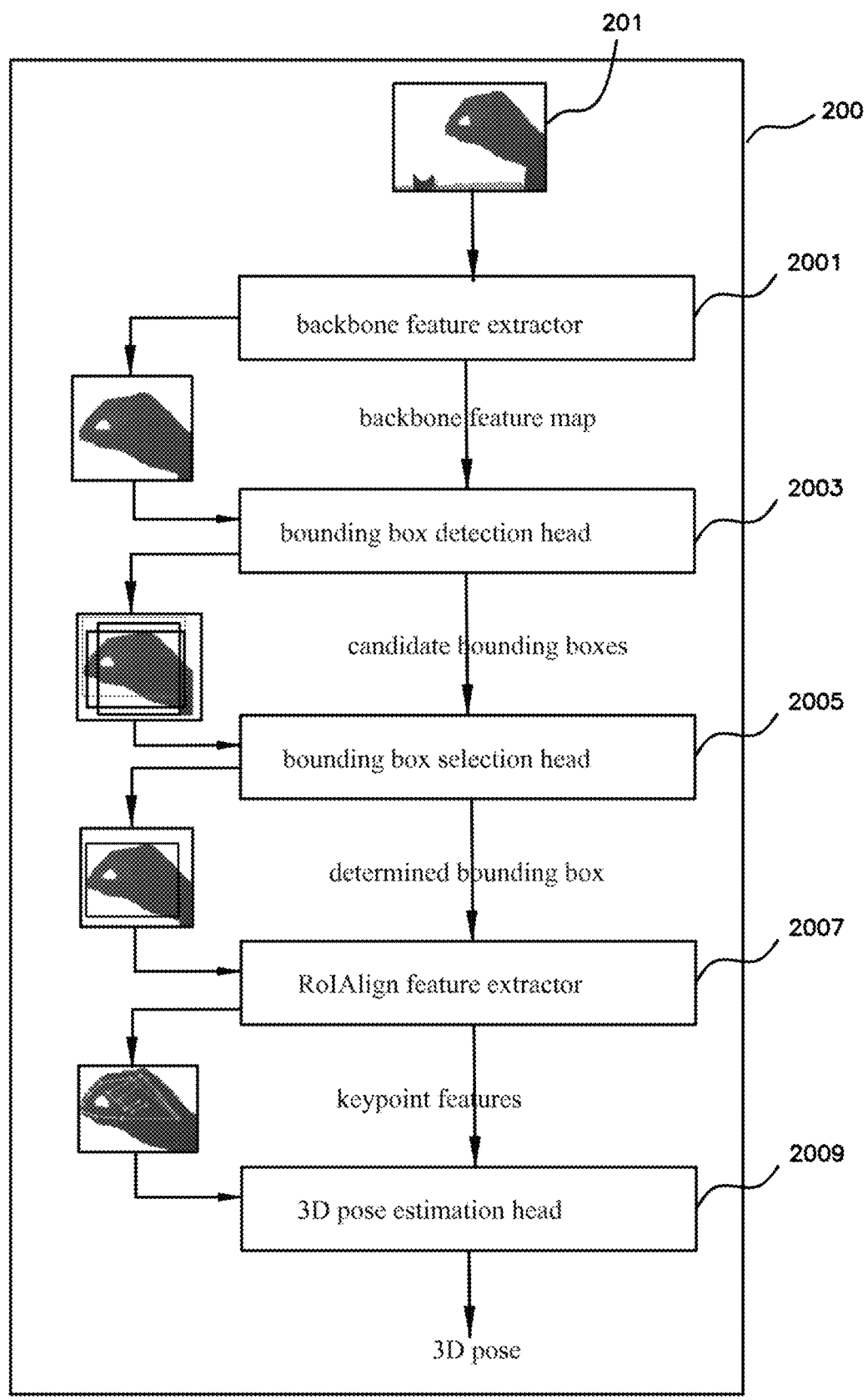
FIG. 4 illustrates a schematic architecture of a machine-learning model for detecting interest object, in accordance with an embodiment of present disclosure.

FIG. 4 illustrates an example architecture of an object detection device 200 according to some embodiments. The object detection device 200 is configured to take as input an image 201 or a preprocessed representation of the image, such as a three-dimensional matrix with dimensions corresponding to the image's height, width, and color channels (e.g., red, green, and blue). The object detection device 200 is configured to extract features of the image 201 and output an object detection indicator (e.g., coordinates of a bounding box surrounding a hand), and/or keypoint features (e.g., representing the pose of a detected hand).

In some embodiments, the object detection device 200 includes several high-level components, including a backbone neural network, also referred to as a backbone feature extractor 2001, a bounding box detection head 2003, a bounding box selection head 2005, and a keypoint feature extractor 2007. Each of these components may be configured as a neural network. Conceptually, in the architecture, the backbone feature extractor 2001 is configured to process an input image 201 and prepare a backbone feature map (e.g., an inception of convolutional outputs) that represents the image 201. The bounding box detection head 2003 takes the feature map generated by the backbone feature extractor 2001 and outputs N proposed regions of interest (RoIs) (e.g. candidate bounding boxes) that may include objects of interest, such as people, hands, faces, or any other types of objects. The bounding box detection head 2003 may then detect which of the N RoIs are likely to contain the object(s) of interest, and output corresponding object detection indicators (e.g. determined bounding box). The object detection indicators may contain the interest object, and define a smaller region, such as a bounding box, of the image 201. In some embodiments, a bounding box may be the smallest or near smallest rectangle (or any other geometric shape(s)) that is able to fully contain the pixels of the interest object. For the RoIs deemed to be sufficiently likely to contain the interest object, which may be referred to as target region definitions, the keypoint feature extractor 2007 may determine their respective keypoint mappings. In some embodiments, the bounding box detection head 2003 and keypoint feature extractor 2007 may perform their respective operations in parallel. In other embodiments, the bounding box detection head 2003 and keypoint feature extractor 2007 may not perform their operations in parallel but instead adopt a multi-staged processing approach, which has the advantage of reducing computation and speeding up the overall operation.

For example, the keypoint feature extractor 2007 may wait for the bounding box detection head 2003 to identify target regions corresponding to RoIs that are likely to contain the interest object. The keypoint feature extractor 2007 may only process those target regions. Since the N number of RoIs initially proposed by the bounding box detection head 2003 may be much larger than the number of RoIs deemed sufficiently likely to contain the interest object, with such an architectural configuration could reduce computations performed by the keypoint feature extractor 2007. Therefore, the operation can be performed on devices that lack sufficient hardware resources, such as electronic devices, mobile devices.

Figure 5:
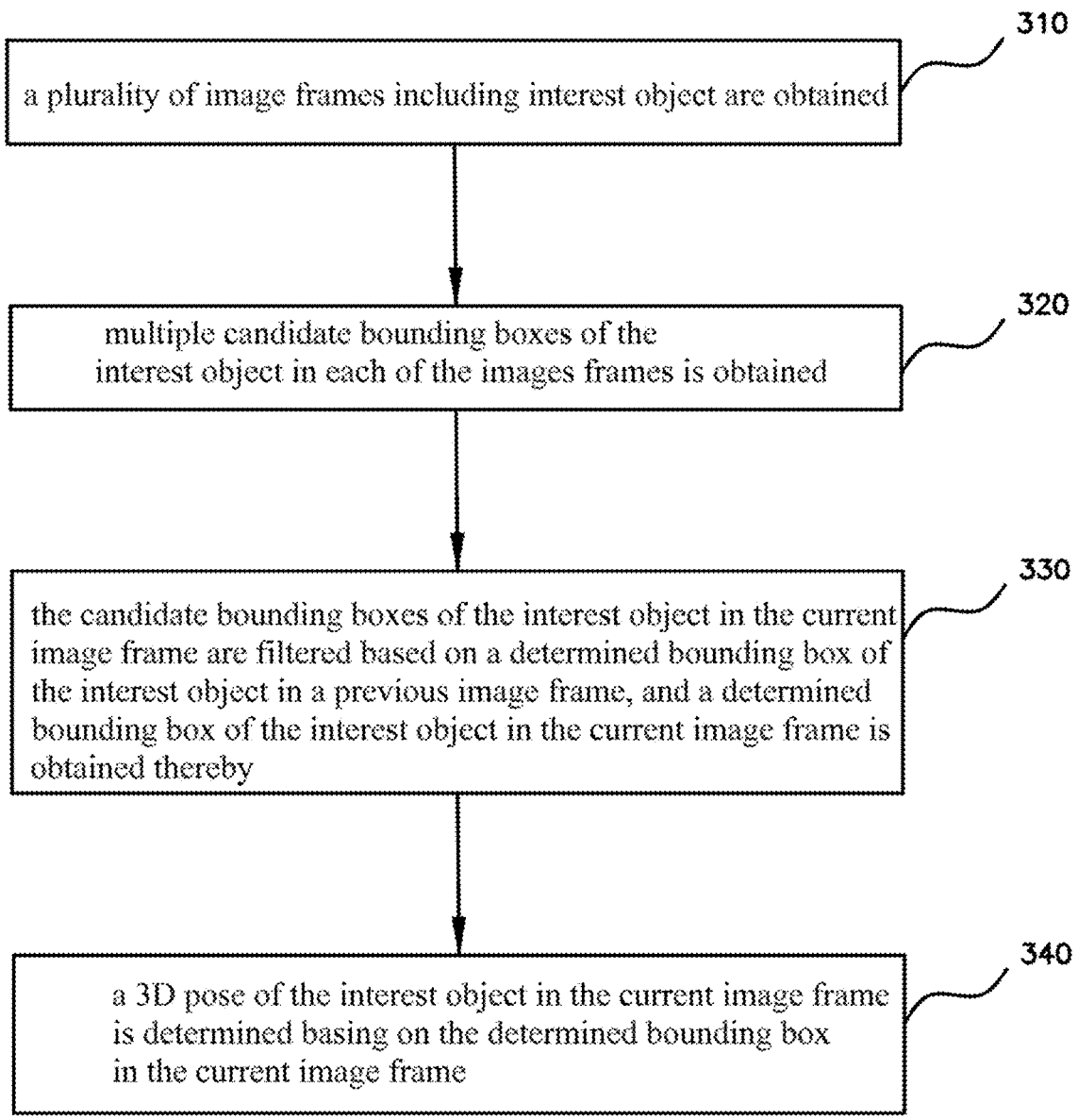
FIG. 5 illustrates a schematic flowchart of an object pose detection method, in accordance with an embodiment of present disclosure.

FIG. 5 illustrates an example method for detecting pose of interest object (e.g., hands) in an image and generating keypoint masks, in accordance with some embodiments. The method may begin at block 310, where a system performing operations based on a machine-learning model may access an image or a frame of a video, and the image and the video may be captured by a camera or a TOF camera of the system, which may be an electronic device.

At block 310, a plurality of image frames including an interest object are obtained.

In some embodiments, the image frames may be obtained from multiple images or video. The images or video may include interest object. In some embodiments, a current image frame including the interest object may be obtained for further processing.

In some embodiments, the images in sequence or video may be captured by the TOF camera. The images may include interest object. In some embodiments, the images in sequence or video may be captured by dynamic vision sensor (DVS) camera. The DVS camera has the characteristic of high power efficiency. However, since the existing object detection algorithms based on neural networks are all high in complexity, the power consumption of the whole vision detection system is still very high. As a result, the requirements of the practical applications cannot be satisfied.

The TOF camera or DVS camera may captures a video data stream. The captured video data stream is converted into images in frames one after another by an image generation unit of the DVS camera or the TOF camera. Thus a plurality of image frames may be obtained. Each one of the image frames corresponds to an image in the video data stream at one time. The plurality of image frames are used as an input of the object detection device 200, so that the image frames are detected by object detection device 200.

At block 320, multiple candidate bounding boxes of the interest object in each of the images frames is obtained.

The image frames are detected by an object detection device 200 to acquire the candidate bounding boxes of the interest object in each of the multiple image frames. In some embodiments, the current image frame can be detected by an object detection device 200 to acquire the candidate bounding boxes of the interest object in the current image frame.

In some embodiments, as illustrated in FIG. 4, the object detection device 200 may include a backbone feature extractor 2001 and a bounding box detection head 2003. The backbone feature extractor 2001 is configured to receive the images frames and generate a backbone feature map of the current image frame based on features of the interest object, and transfer the backbone features map to the bounding box detection head 2003. The bounding box detection head 2003 is configured to detect candidate bounding boxes of the interest object in the current image frame based on the backbone feature map, according to a determined bounding box of the interest object in a previous image frame.

In some embodiments, the backbone feature extractor 2001 may include a convolutional neural network (CNN) and a region proposal network (CPN).

Convolutional Neural Network

The convolutional neural network consists of an input and an output layer, as well as multiple hidden layers. The hidden layers of a CNN typically consist of a series of convolutional layers that convolve with a multiplication or other dot product. The activation function is commonly a RELU layer, and is subsequently followed by additional convolutions such as pooling layers, fully connected layers and normalization layers, referred to as hidden layers because their inputs and outputs are masked by the activation function and final convolution. The final convolution, in turn, often involves backpropagation in order to more accurately weight the end product. Though the layers are colloquially referred to as convolutions, this is only by convention. Mathematically, it is technically a sliding dot product or cross-correlation. This has significance for the indices in the matrix, in that it affects how weight is determined at a specific index point.

Convolutional

When programming a CNN, each convolutional layer within a neural network should have the following attributes: input is a tensor with shape (number of images)×(image width)×(image height)×(image depth). Convolutional kernels whose width and height are hyper-parameters, and whose depth must be equal to that of the image. Convolutional layers convolve the input and pass its result to the next layer. This is similar to the response of a neuron in the visual cortex to a specific stimulus.

Each convolutional neuron processes data only for its receptive field. Although fully connected feedforward neural networks can be used to learn features as well as classify data, it is not practical to apply this architecture to images. A very high number of neurons would be necessary, even in a shallow (opposite of deep) architecture, due to the very large input sizes associated with images, where each pixel is a relevant variable. For instance, a fully connected layer for a (small) image of size 100×100 has 10,000 weights for each neuron in the second layer. The convolution operation brings a solution to this problem as it reduces the number of free parameters, allowing the network to be deeper with fewer parameters. For instance, regardless of image size, tiling regions of size 5×5, each with the same shared weights, requires only 25 learnable parameters. In this way, it resolves the vanishing or exploding gradients problem in training traditional multi-layer neural networks with many layers by using backpropagation.

Pooling

Convolutional networks may include local or global pooling layers to streamline the underlying computation. Pooling layers reduce the dimensions of the data by combining the outputs of neuron clusters at one layer into a single neuron in the next layer. Local pooling combines small clusters, typically 2×2. Global pooling acts on all the neurons of the convolutional layer. In addition, pooling may compute a max or an average. Max pooling uses the maximum value from each of a cluster of neurons at the prior layer. Average pooling uses the average value from each of a cluster of neurons at the prior layer.

Fully Connected

Fully connected layers connect every neuron in one layer to every neuron in another layer. It is in principle the same as the traditional multi-layer perceptron neural network (MLP). The flattened matrix goes through a fully connected layer to classify the images.

The backbone feature extractor may obtain the backbone features of the current image frame via the convolutional neural network. For example, the current image frame may be input into the convolutional neural network, and then the backbone features of the current image frame is output by the convolutional neural network. The backbone features of interest object in the current image frame define an outer contour of the interest object. For example, the backbone features may indicate one or more (such as five) fingers of a detected hand. The interest object in the current image frame may have one or more backbone features. Each of the one or more backbone features of the interest object may be represented as two-dimensional coordinates that indicate opposite ends of the backbone feature. The backbone feature extractor 2001 may generate one or more feature map(s) based on the backbone features of the interest object, via the convolutional neural network. The region proposal network may receive the output of the convolutional neural network as an input (e.g., receives the backbone features). The region proposal network may then output proposals backbone feature map(s). The backbone feature map(s) may be input into the bounding box detection head 2003.

In some embodiments, the bounding box detection head 2003 is configured to output a regression map based on the backbone feature map(s) transferred from the backbone feature extractor 2001. The regression map is in size of H×W×C, wherein C represents the numbers of channels including one bounding box confidence and locations and shapes of multiple types of candidate bounding boxes, H represents a height of the candidate bounding box, and W represents a width of the candidate bounding box. The multiple types of candidate bounding boxes may be obtained by computing via multiple computing templates of the bounding box detection head 2003. In particular, the bounding box detection head 2003 may include at least one convolutional neural network with multiple computing templates. The backbone feature map(s) of the interest object are input into the multiple computing templates, and then multiple types of candidate bounding boxes are output. One candidate bounding box is generated by one corresponding computing templates. Each one of the computing templates has been previously trained to indicate a likely shape of a bounding box of the interest object. The bounding boxes indicated by the computing templates may be in different sizes and/or different aspect ratios. In the illustrated embodiments, the aspect ratio indicates a ratio of a height of the bounding box to a width of the bounding box.

In some embodiments, the convolutional neural network in the bounding box detection head 2003 may be trained in previously to generate the candidate bounding boxes. When training, the convolutional neural network needs an input image (including the backbone features map) and a ground truth boxes. In a convolutional fashion, a set of candidate bounding boxes of different aspect ratios is evaluated at each location in several feature maps with different scales (e.g. 8×8 and 4×4). For each candidate bounding box, location offsets (i.e., the offsets between a center of the ground truth bounding box and a center of the candidate bounding box), and shape offsets (i.e., the offsets between a shape of the ground truth bounding box and a shape of the candidate bounding box are predicted. The shapes of the ground truth bounding box and the candidate bounding box may be represented by heights and widths (H×W) of which. Confidence for all of objects categories (c1, c2, . . . , cp) may also be predicted. For hand detection in the illustrated embodiment, there is only one category (hand category c1). At training time, these predicted candidate bounding boxes are matched to the ground truth box. Then a coincidence degree of each of the candidate bounding boxes to the ground truth box is computed. One or some of the predicted candidate bounding boxes with a low coincidence degree (e.g. less than a coincidence threshold) may be ignored, and one or some of the predicted candidate bounding boxes with a high coincidence degree (e.g. greater than a coincidence threshold) may be left for further processing.

In some embodiments, the regression map is in size of H×W×C are generated by the convolutional neural network by executing the multiple computing templates. In the C channels of the candidate bounding boxes, there are 1 channel for the bounding box confidence, and (C−1) channels represent the location offsets (including two-dimensional coordinates) and shape offsets (including height and width) regarding to ((C−1)/4) types of candidate bounding boxes. The location offsets may be defined between a center of each candidate bounding box and a center of a ground truth box corresponding to the interest object. For example, for one candidate bounding box, the location offsets may include an x coordinate offset between the center of the candidate bounding box and the center of the ground truth box corresponding to the interest object, and a y coordinate offset between the center of the candidate bounding box and the center of the ground truth box corresponding to the interest object. The shape offsets may be defined between a shape of each one of the candidate bounding boxes and a shape of the ground truth box corresponding to the interest object. For example, for one candidate bounding box, the shape offsets may include a height offset between the candidate bounding box and the ground truth box corresponding to the interest object, and a width offset between the candidate bounding box and the ground truth box corresponding to the interest object.

In a particular embodiment, the regression map output from the bounding box detection head 2003 is in size of 12×15×57 (i.e., H×W×C). In the regression map, 57 channels include 1 channel for a bounding box confidence map, the other 56 channels represent location offset maps and shape offset maps regarding to 14 types of candidate bounding boxes. The bounding box confidence map of the candidate bounding boxes according to the output regression map is name as C. Each element in C is represented as $c_{i,j}^{t}$, i.e., the confidence value on the location with coordinate (i, j) of the current image frame at time t. The location offset maps are named as L. Each element in L is represented as $(x_{i,j}^{t}, y_{i,j}^{t})$ i.e., the x and y offsets at location with coordinate (i, j) of the current image frame at time t, with respect to the center of the ground truth bounding box. The shape offset maps are named as S. Each element in S is $(w_{i,j}^{t}, h_{i,j}^{t})$, i.e., the width and height offsets at location with coordinate (i, j) of the current image frame at time t, with respect to the shape of the ground truth bounding box. Therefore, the candidate bounding boxes are presented as $(x_t, y_t, w_t, h_t, c_t)$ of image frame at time t, and output by the bounding box detection head 2003.

As stated in above embodiments, to obtain the multiple candidate bounding boxes of the interest object in block 320, the operation may include: detecting the image frames (or the current image frame) and obtaining a backbone feature map of the interest object in the current image frame, and determining multiple candidate bounding boxes of the interest object in the current image frame. The operation determining multiple candidate bounding boxes of the interest object in the current image frame may include: inputting the backbone feature map to N computing template(s) corresponding to the interest object, where N being a positive integer; obtaining a regression map based on the backbone feature map, and the regression map including a bounding box confidence map, N location offset map(s), and N shape offset map(s); and determining the multiple candidate bounding boxes based on the regression map. In some embodiments, N is greater than 1, the backbone feature map may be input to N computing templates, and the regression map may include N location offset maps, and N shape offset maps, thus N candidate bounding boxes may be obtained based the regression map.

At block 330, the candidate bounding boxes of the interest object in the current image frame are filtered based on a determined bounding box of the interest object in a previous image frame, and a determined bounding box of the interest object in the current image frame is obtained thereby.

In some embodiments, the determined bounding box of the interest object in the previous image frame at time (t−1) has been determined according block 310 and block 320. The determined bounding box of the interest object in the previous image frame at time (t−1) can be represented as $(x_{t-1}, y_{t-1}, w_{t-1}, h_{t-1}, c_{t-1})$. The candidate bounding boxes of the interest object in the current image frame at time t may be filtered based on the determined bounding box. The candidate bounding boxes $(x_t, y_t, w_t, h_t, c_t)$ are filtered based on the fact that the bounding box center location and shape cannot change too much between neighboring frames. In particular, the bounding box confidence map, location offset maps, and shape offset maps of the candidate bounding boxes may be filtered according to the determined bounding box $(x_{t-1}, y_{t-1}, w_{t-1}, h_{t-1}, c_{t-1})$.

Figure 6:
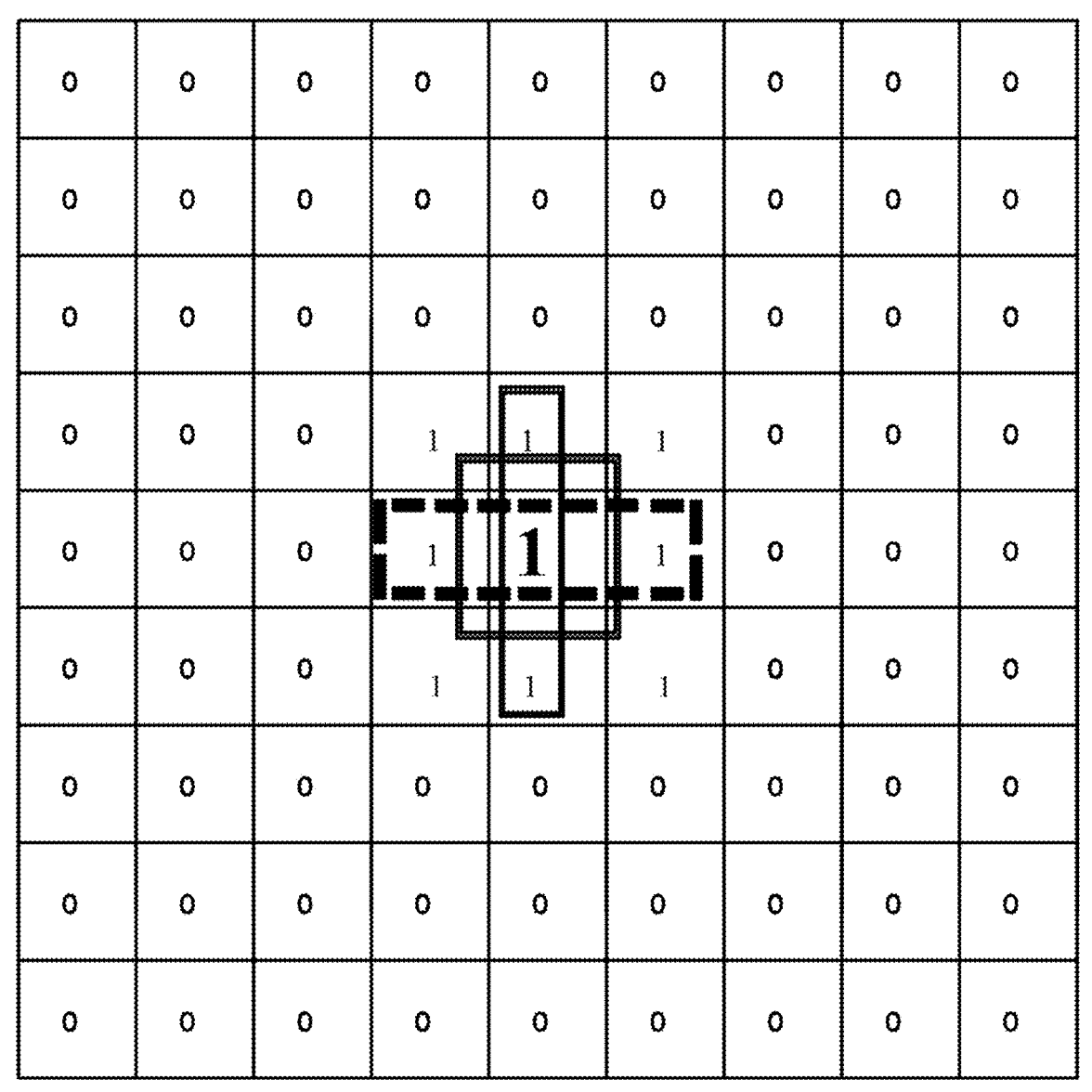

The bounding box confidence map may be filtered by multiplying it with a confidence mask of the determined bounding box in previous image frame. For example, as illustrated in FIG. 6, the confidence mask of size H×W (i.e. height×width) may be created before filtering the candidate bounding boxes. The confidence mask is then initialized with 0. In the confidence mask, a location of the determined bounding box in previous image frame is marked as 1, its neighboring 8 locations are also marked as 1. The location highlighted in bold font is the determined bounding box of the interest object in the previous image frame at time t−1. The locations around location highlighted in bold font are all 1, all the other locations are marked with 0. It can be understood that, the location of the determined bounding box or the candidate bounding box is represented by coordinates of a center of the determined bounding box or the candidate bounding box. For filtering the candidate bounding boxes, the bounding box confidence map of the candidate bounding boxes may be multiplied with the confidence mask as above.

The location and shape offset maps of the candidate bounding boxes may be filtered by multiplying them with a shape mask of the determined bounding box. A shape mask of size H×W×N (i.e., N represents N types of candidate bounding boxes) may be created before filtering the candidate bounding boxes. The shape mask is then initialized with 0. In the shape mask, on the aspect of location, a location of the determined bounding box in previous image frame is marked as 1, its neighboring 8 locations are also marked as 1. On the aspect of types of candidate bounding boxes, one of the candidate bounding boxes, whose aspect ratio is most similar to that of the determined bounding box in the previous image frame, is selected among all the candidate bounding boxes. The selected candidate hounding box is selected and a corresponding element in shape mask corresponding to the selected bounding box is marked to 1. And the selected candidate bounding box is determined as the determined bounding box of the interest object in the current image frame at time t. As illustrated in FIG. 6, the location highlighted in bold font is the determined bounding box of the interest object in the previous image frame at time t−1. The locations around location highlighted in bold font are all 1, all the other locations are marked with 0. Also, there are N types (e.g. 3 types) of candidate bounding boxes, the candidate bounding box in dashed line is the determined bounding box in the previous image frame at time t−1. For filtering the candidate bounding boxes, the location offset maps and the shape offset maps of the candidate bounding boxes may be multiplied with the shape mask as above.

In some embodiments, the operation of filtering the candidate bounding boxes is directly performed when the candidate bounding boxes of the interest object in the current image frame is obtained.

In other embodiments, the operation of filtering the candidate bounding boxes is only performed when the bounding box confidence of the determined bounding box in the previous image frame is greater than a coincidence threshold. In this situation, the operation of filtering the candidate bounding boxes may include: obtaining a bounding box confidence of the determined bounding box of the interest object in the previous image frame at time t−1; filtering the candidate bounding boxes, of the interest object in the current image frame at time t, based on the determined bounding box, when the bounding box confidence of the determined bounding box is greater than a coincidence threshold (e.g., 0.99). In some embodiments, when the bounding box confidence of the determined bounding box is not greater than the coincidence threshold, the operation of filtering the candidate bounding boxes may be performed, and one of the candidate bounding boxes, whose location offsets or shape offsets is the least, may be determined as the determined bounding box of interest object in the current image frame at time t.

In some embodiments, the position of an interest object to be detected should be coherent in time domain. In other words, there is only a limited offset between two adjacent frames of the same interest object. Therefore, the direction of a motion of an interest object can be estimated according to low-level image features of two adjacent frames by a light-weight network, so that the position of the interest object in the current image frame can be obtained from the position of the interest object in the previous image frame. Thus, the candidate bounding boxes $(x_t, y_t, w_t, h_t, c_t)$ can be filtered, under a temporal coherency constraint, based on the determined bounding box $(x_{t-1}, y_{t-1}, w_{t-1}, h_{t-1}, c_{t-1})$, to obtain a determined bounding box of the interest object in the current image frame. The temporal coherency constraint means that a distance between a position, e.g., a previous position, of the interest object at a previous time and a position, e.g., a current position, of the interest object at the current time is less than a distance threshold. The distance may be a Euclidean distance or a Manhattan distance. One of the candidate bounding boxes, which satisfies the temporal coherency constraint, may be determined as the determined bounding box of the interest object in the current image frame. That is, one of the candidate bounding boxes in current image frame may be determined as the determined bounding box, when: the confidence offset between the one candidate bounding box and the determined bounding box in previous image frame is less than a confidence threshold, the location offsets between the one candidate bounding box and the determined bounding box in previous image frame is less than a location threshold, and the shape offsets between the one candidate bounding boxes and the determined bounding box in previous image frame are less than corresponding shape thresholds. The determined bounding box in the current image frame at time t may be used as a based for filtering candidate bounding boxes in the next image frame at time (t+1).

In some embodiments, the object detection device 200 include a bounding box selection head 2005. The bounding box selection head 2005 is configured to determine a bounding box of the interest object in the current image frame by filtering the candidate bounding boxes. In particular, the bounding box selection head 2005 may generate a candidate bounding box template based on candidate bounding boxes in each image frames, and determine one of the candidate bounding boxes, which satisfies the temporal coherency constraint, as the determined bounding box of the interest object in the current image frame t.

In some embodiments, the candidate bounding box template may be a directed acyclic graph used for tracking the interest object. The input of the candidate bounding box template is the candidate bounding boxes in the current image frame and the determined bounding box in the previous image frame, while the output thereof is the determined bounding box in the current image frame.

The candidate bounding box template may include a plurality of graph layers, each of which corresponds to an image frame. Each node in each image frame represents one of the candidate bounding boxes. Edges in the graph represent possible motions of the interest object. For example, an edge from a node $v_{i,t-1}$ to a node $v_{j,t}$ represents a possible motion from a position i to a position j within a period from time (t−1) to time t. The temporal coherency constraint is defined as: Distance(Position($v_{i,t-1}$) Position($v_{j,t-1}$))<Threshold. Therefore, an edge from a node $v_{i,t-1}$ to a node $v_{j,t}$ is generated only when the candidate positions $v_{i,t-1}$ and $v_{j,t}$ of the interest object satisfy the temporal coherency constraint. In other words, a distance between the position of the interest object at the time t and the position of the interest object at the time step (t−1) is less than a threshold. The distance can be but not limited to a Euclidean distance or a Manhattan distance. Each path in the graph represents a possible motion trajectory of the interest object.

At each time, the candidate bounding box template will receive a plurality of candidate bounding boxes. For each one of the bounding detection boxes, a temporal trajectory of this candidate bounding box may be extracted. In this embodiment, the temporal coherency constraint means that a length temporal trajectory of the interest object at the current time with respect to the previous time is less than a preset length threshold. One of the candidate bounding boxes, which satisfies the temporal coherency constraint, may be determined as the determined bounding box of the interest object in the current image frame. That is, one of the candidate bounding boxes in current image frame may be determined as the determined bounding box, when the respective length temporal trajectory of the interest object at the current time with respect to the previous time is less than the preset length threshold. The input of the candidate bounding box template is the candidate bounding boxes in the current image frame and the determined bounding box in the previous image frame, while the output thereof is the determined bounding box in the current image frame. The determined bounding box in the current image frame at time t may be used as a based for filtering candidate bounding boxes in the next image frame at time (t+1).

In some embodiments, the object detection device 200 may include a bounding box selection head 2005 having a shortcut detection network. The shortcut detection network is designed as a network having a lighter weight than traditional complete detection network. The input of the shortcut detection network is the candidate bounding boxes ($x_t$, $y_t$, $w_t$, $h_t$, $c_t$) of the interest object in the current image frame and the determined bounding box ($x_{t-1}$, $y_{t-1}$, $w_{t-1}$, $h_{t-1}$, $c_{t-1}$) of the interest object in the previous image frame; and the output of the shortcut detection network is the determined bounding box of the interest object of the current image frame. The operation of processing image frames by the shortcut detection network is as follows.

First, a new map, including a new confidence map, a new locations map, and a new shape map, is obtained by connecting the bounding box confidence map, the locations offsets map, and the shape offsets map of each one of the candidate bounding boxes in the current image frame in series, to the bounding box confidence map, the locations map, and the shape map of the determined bounding box of the previous image frame. Then, the determined bounding box of the previous image frame is used as a RoI (region of interest), and a feature vector of this RoI is pooled from the new map by a RoI pooling layer. Finally, this feature vector is processed by two branches respectively, where one of the branches is used for classifying objects within this RoI by a softmax layer, while the other one thereof is used for regressing parameters for the determined bounding box for the interest object in current image frame. Thus the determined bounding box in current image frame is obtained according to the parameters. The determined bounding box in the current image frame at time t may be used as a based for filtering candidate bounding boxes in the next image frame at time (t+1).

At block 340, a pose of the interest object in the current image frame is determined based on the determined bounding box in the current image frame.

In some embodiments, keypoint features of the interest object enclosed by the determined bounding box are extracted, and the pose of the interest object in the current image frame is determined based on the keypoint features of the interest object. The pose of the interest object may be a 2D (two-dimensional) pose or a 3D (three-dimensional) pose.

In some embodiments, the method is applied to detect a 2D hand pose, and the interest object may be a hand of a person. It should be understood that, the numbers of the interest object(s) may not be limited here. The object detection device 200 may detect one or more interest object at the same time. In a schematic 2D hand pose estimation, the depth image is input to the object detection device 200, and 2D locations of keypoint features of the hand skeleton are obtained. Each one of the keypoint features is a 2D coordinates (e.g., x, y, wherein x is on horizontal image axis, y is on vertical image axis), representing the locations. The 2D hand pose is determined based on the keypoint features, and output by the object detection device 200.

In some embodiments, the method is applied to detect a 3D hand pose, and the interest object may be a hand of a person. It should be understood that, the numbers of the interest object(s) may not be limited here. The object detection device 200 may detect one or more interest object at the same time. In a schematic 3D hand pose estimation, the depth image is input to the object detection device 200, and 3D locations of keypoint features of the hand skeleton are obtained. Each one of the keypoint features is a 3D coordinate (e.g., x, y, z, wherein x is on horizontal image axis, y is on vertical image axis, z is on the depth direction), representing the locations. The 3D hand pose is determined based on the keypoint features, and output by the object detection device 200.

In some embodiments, the object detection device 200 may include a keypoint features extractor 2007 and a pose estimation head 2009. The keypoint features extractor 2007 is configured to extract keypoint features of the interest object defined by the determined bounding box in the current image frame. The pose estimation head 2009 is configured to estimate the pose of the interest object based on the keypoint features of the interest object defined by the determined bounding box in the current image frame.

The determined bounding box in the current image frame is obtained in block 330. The interest object in the image is represented by the determined bounding box. In some embodiments, the determined bounding box is represented as $(x_{min}, y_{min}, x_{max}, y_{max})$, wherein $(x_{min}, y_{min})$ is the left-top corner of the determined bounding box, $(x_{max}, y_{max})$ is the right-down corner of the determined bounding box. When received the determined bounding box, the keypoint features extractor 2007 is configured to extract keypoint features of the interest object in the determined bounding box. In some embodiments, the keypoint features extractor 2007 may output a plurality of pose probability models corresponding to a plurality of interest parts of the interest body, such as hand parts (e.g., joints of fingers), respectively. The plurality of pose probability models may be configured for determining a probability of the associated interest part being at a location in the image. For example, each pose probability model may be a heat map that indicates, for each location represented in a heat map, a probability or confidence score that the associated body part is located at that location.

The keypoint features extractor 2007 is configured to extract keypoint features, of the interest object in the determined bounding box in the current image frame, with a RoIAlign layer. The backbone feature map obtained by the backbone feature extractor 2001, and the determined bounding box obtained by the bounding box selection head 2005 may be input to the RoIAlign layer. The RoIAlign layer may extract and output keypoint features based on the backbone feature map and the determined bounding box.

RoIAlign layer may removes the harsh quantization of RoIPool, properly aligning the extracted keypoint features with the input. Our proposed change is simple: we avoid any quantization of the RoI boundaries or bins (i.e., we use x/16 instead of [x/16]). We use bilinear interpolation to compute the exact values of the input features at four regularly sampled locations in each RoI bin, and aggregate the result (using max or average). We note that the results are not sensitive to the exact sampling locations, or how many points are sampled, as long as no quantization is performed.

The pose estimation head 2009 is configure to determine the pose of the interest object in the current image frame, based on the pose probability models. A computing system may access a plurality of pose probability models for a plurality of predetermined parts of the interest object that is depicted in an image, respectively. Each of the plurality of pose probability models is configured for determining a probability of the associated predetermined part of the interest object being at a location in the image. As previously described, the pose probability models may be probability heat maps generated by the keypoint features extractor 2007.

The pose estimation head 2009 may determine a candidate pose that is defined by a set of coordinates representing candidate locations of the predetermined parts of the body in the image. Then the pose estimation head 2009 may determine a first probability score for the candidate pose based on the plurality of pose probability models and the set of coordinates of the candidate pose. Then the pose estimation head 2009 may generate a pose representation for the candidate pose using a transformation model and the candidate pose. The pose estimation head 2009 may determine a second probability score for the pose representation based on a pose-representation probability model. Finally, the pose estimation head 2009 may select the candidate pose to represent a pose of the body depicted in the image based on at least the first probability score for the candidate pose, the second probability score for the pose representation.

In accordance with the embodiments of present disclosure, the object pose detection method may improve a robustness of bounding box detection for interest object. We leverage the determined bounding box in the previous image frame to constrain the location and shape of the bounding box in the current image frame, leading to more accurate object pose detection results.

Figure 7:
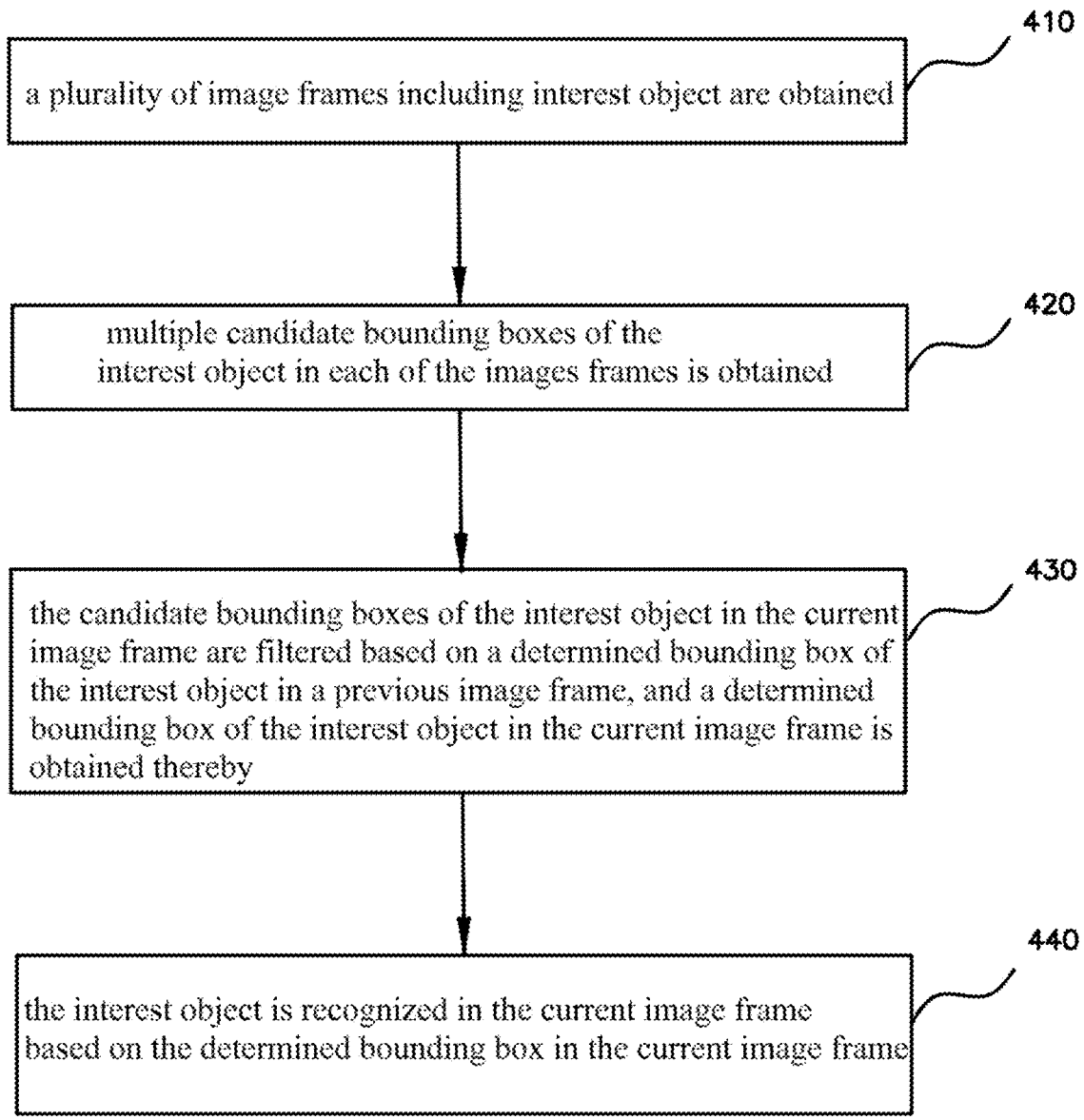
FIG. 7 illustrates a schematic flowchart of an object detection method, in accordance with an embodiment of present disclosure.

Based on the object pose detection method, an object detection method also provided, in accordance with one embodiment of the present disclosure. FIG. 7 illustrates a schematic flowchart of an object detection method. The method may begin at block 410, where a system performing operations based on a machine-learning model may access an image or a frame of a video, and the image and the video may be captured by a camera or a TOF camera of the system, which may be an electronic device). In the object detection method, there may be some operations in the same process with the object pose detection method described in the above embodiments, which can refer to the above embodiments and will not repeat herewith.

At block 410, a plurality of image frames including interest object are obtained. In the illustrated embodiment, detail operations in block 410 can refer to operations in block 310.

At block 420, multiple candidate bounding boxes of the interest object in each of the images frames is obtained. In the illustrated embodiment, detail operations in block 420 can refer to operations in block 320.

At block 430, the candidate bounding boxes of the interest object in the current image frame are filtered based on a determined bounding box of the interest object in a previous image frame, and a determined bounding box of the interest object in the current image frame is obtained thereby.

At block 440, the interest object is recognized in the current image frame based on the determined bounding box in the current image frame.

In some embodiments, keypoint features of the interest object enclosed by the determined bounding box are extracted, and the interest object in the current image frame is recognized based on the keypoint features of the interest object.

The determined bounding box in the current image frame is obtained in block 430. The interest object in the image is represented by the determined bounding box. In some embodiments, the determined bounding box is represented as $(x_{min}, y_{min}, x_{max}, y_{max})$, wherein $(x_{min}, y_{min})$ is the left-top corner of the determined bounding box, $(x_{max}, y_{max})$ is the right-down corner of the determined bounding box. When received the determined bounding box, the keypoint features extractor 2007 is configured to extract keypoint features of the interest object in the determined bounding box. The object detection device 200 may recognize and obtain a position of the interest object in the determined bounding box based on the keypoint features of the interest object. In some embodiments, the recognized interest object may be tracked according to the position. In some embodiments, the current image frame with the recognized interest object may be input to the pose estimation head 2009 for object pose detection. In some embodiments, the current image frame with the recognized interest object may be further processed for tracking.

In accordance with the embodiments of present disclosure, the object detection method may improve a robustness of bounding box detection for interest object. We leverage the determined bounding box in the previous image frame to constrain the location and shape of the bounding box in the current image frame, leading to more accurate object detection results.

Figure 8:
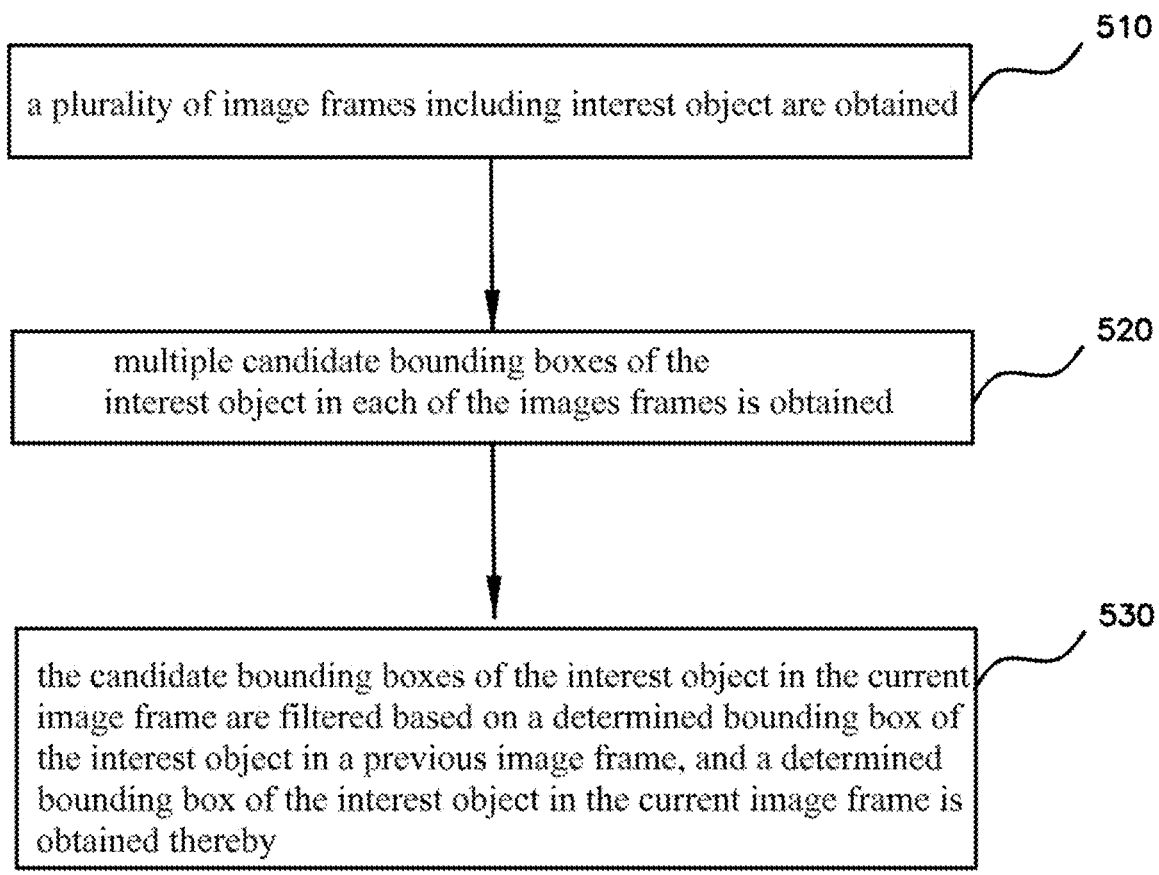
FIG. 8 illustrates a schematic flowchart of another object detection method, in accordance with an embodiment of present disclosure.

Based on the object pose detection method, another object detection method also provided, in accordance with one embodiment of the present disclosure. FIG. 8 illustrates a schematic flowchart of an object detection method. The method may begin at block 510, where a system performing operations based on a machine-learning model may access an image or a frame of a video, and the image and the video may be captured by a camera or a TOF camera of the system, which may be an electronic device). In the object detection method, there may be some operations in the same process with the object pose detection method described in the above embodiments, which can refer to the above embodiments and will not repeat herewith.

At block 510, a plurality of image frames including interest object are obtained. In the illustrated embodiment, detail operations in block 510 can refer to operations in block 310.

At block 520, multiple candidate bounding boxes of the interest object in each of the images frames is obtained. In the illustrated embodiment, detail operations in block 520 can refer to operations in block 320.

At block 530, the candidate bounding boxes of the interest object in the current image frame are filtered based on a determined bounding box of the interest object in a previous image frame, and a determined bounding box of the interest object in the current image frame is obtained thereby. In the illustrated embodiment, detail operations in block 530 can refer to operations in block 330.

When a bounding box of the interest object is determined, the determined bounding box is prepared for further processing. For example, the determined bounding box may be processed for tracking the interest object, as describe in block 440; the determined bounding box may be processed for detecting the pose of the interest object, as describe in block 340.

Figure 9:
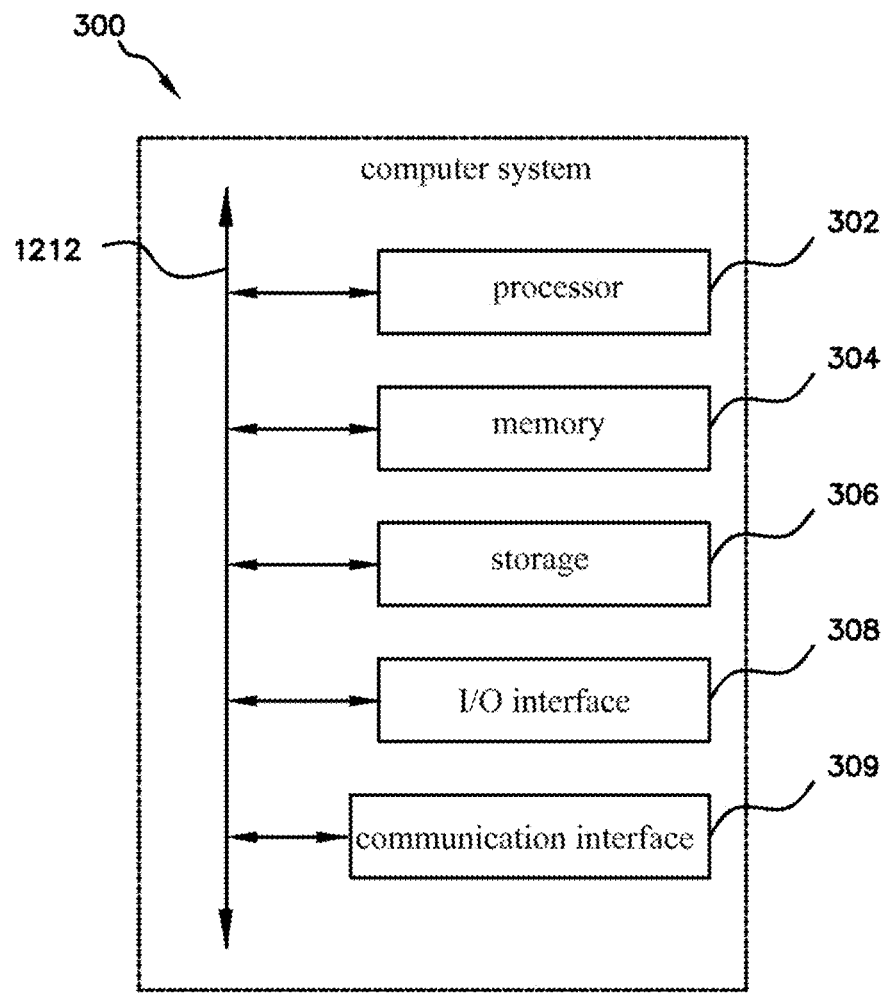
FIG. 9 illustrates an example computer system for object pose detection, in accordance with an embodiment of present disclosure.

FIG. 9 illustrates an example computer system 300. In some embodiments, one or more computer systems 300 perform one or more blocks of one or more methods described or illustrated herein. In some embodiments, one or more computer systems 300 provide functionality described or illustrated herein. In some embodiments, software running on one or more computer systems 300 performs one or more blocks of one or more methods described or illustrated herein or provides functionality described or illustrated herein. Some embodiments include one or more portions of one or more computer systems 300. Herein, reference to a computer system may encompass a computing device, and vice versa, where appropriate. Moreover, reference to a computer system may encompass one or more computer systems, where appropriate.

In some embodiments, computer system 300 includes a processor 302, memory 304, storage 306, an input/output (I/O) interface 308, a communication interface 309, and a bus 1212. In some embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. Memory 304 includes main memory for storing instructions for processor 302 to execute or data for processor 302 to operate on. Storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. I/O interface 308 includes hardware, software, or both, providing one or more interfaces for communication between computer system 300 and one or more I/O devices. Communication interface 309 includes hardware, software, or both providing one or more interfaces for communication (such as, for example, packet-based communication) between computer system 300 and one or more other computer systems 300 or one or more networks. Bus 1212 includes hardware, software, or both coupling components of computer system 300 to each other.

It should be understood that, the operations in this embodiment similar to corresponding operations in the above embodiments may be referred to the above embodiments.

The embodiment of the present disclosure also provides a non-transitory computer-readable medium. The computer-readable medium stores at least one instruction. The at least one instruction is loaded and executed by the processor to perform the object pose detection method described in each of the above embodiments.

The embodiments of the present disclosure also provide a computer program product that stores at least one instruction. The at least one instruction is loaded and executed by the processor to perform the object pose detection method described in each of the above embodiments.

It should be noted that when the device provided in the above embodiments executes the object pose detection method, the division of the above functional modules is only used as an example for describing. In actual applications, the above functions can be allocated to different function modules according to different requirements. In other words, internal structure of the device may be divided into different functional modules to complete all or part of the functions described above. In addition, the device provided by the above-mentioned embodiments belongs to the same concept as the embodiments of the object pose detection method. For the specific implementation process, as illustrated in the method embodiments, which will not be repeated here.

The serial numbers of the above embodiments of the present disclosure are only for description, and do not represent the advantages and disadvantages of the embodiments.

Those of ordinary skill in the art can understand that all or part of the blocks in the above embodiments can be implemented by hardware, or by a program instructing related hardware to complete. The program can be stored in a computer-readable storage medium. The storage medium above-mentioned can be a read-only memory, a magnetic disk or an optical disk, etc.

The above-mentioned embodiments are merely illustrative of several embodiments of the present disclosure, and the description thereof is more specific and detailed, however is not to be construed as limiting the scope of the present disclosure. It should be noted that various variations and modifications may be made by those skilled in the art without departing from the spirit and scope of the present disclosure.

What is claimed is:

1. An object detection method, comprising:
obtaining a plurality of candidate bounding boxes of an interest object in a current image frame; and
filtering the plurality of candidate bounding boxes based on a determined bounding box of the interest object in a previous image frame, to obtain a determined bounding box of the interest object in the current image frame,
wherein obtaining the plurality of candidate bounding boxes of the interest object in the current image frame, comprises:
detecting the current image frame and obtaining a backbone feature map of the interest object in the current image frame;
obtaining a regression map based on the backbone feature map; and
determining N candidate bounding boxes based on the regression map, wherein N is an integer greater than 1;
wherein the regression map comprises a bounding box confidence map, N location offset maps, and N shape offset maps; each of the N location offset maps indicates a location offset between a center of each candidate bounding box and a center of a ground truth box corresponding to the interest object; and each of the N shape offset maps indicates a shape offset between each candidate bounding box and the ground truth box.

2. The method of claim 1, wherein filtering the plurality of candidate bounding boxes based on a determined bounding box of the interest object in a previous image frame, to obtain a determined bounding box of the interest object in the current image frame, comprises:
filtering the bounding box confidence map of the plurality of candidate bounding boxes by multiplying it with a confidence mask of the determined bounding box of the interest object in the previous image frame, to obtain the determined bounding box of the interest object in the current image frame.

3. The method of claim 2, further comprising:
creating the confidence mask in such a manner that a first location of the determined bounding box in the previous image frame is marked as 1 in the confidence mask, neighboring 8 locations surrounding the first location are marked as 1 in the confidence mask, and all other locations are marked as 0 in the confidence mask.

4. The method of claim 1, wherein filtering the plurality of candidate bounding boxes based on a determined bounding box of the interest object in a previous image frame, to obtain a determined bounding box of the interest object in the current image frame, comprises:
filtering the location offset maps and the shape offset maps of the plurality of candidate bounding boxes by multiplying them with a shape mask of the determined bounding box of the interest object in the previous image frame, to obtain the determined bounding box of the interest object in the current image frame.

5. The method of claim 4, wherein, before filtering the location offset maps and the shape offset map of the plurality of candidate bounding boxes by multiplying them with a shape mask of the determined bounding box of the interest object in the previous image frame, the method comprises:
obtaining a bounding box confidence of the determined bounding box of the interest object in the previous image frame; and
wherein the filtering the location offset maps and the shape offset map of the plurality of candidate bounding boxes by multiplying them with a shape mask of the determined bounding box of the interest object in previous image frame, comprises:
filtering the location offset maps and the shape offset maps of the plurality of candidate bounding boxes by multiplying them with a shape mask of the determined bounding box of the interest object in the previous image frame, in response to determining that the bounding box confidence is greater than a coincidence threshold.

6. The method of claim 5, further comprising:
determining one of the plurality of candidate bounding boxes, whose location offset or shape offset is the least, as the determined bounding box of the interest object in the current image frame, in response to determining that the bounding box confidence is not greater than the coincidence threshold.

7. The method of claim 4, wherein a shape of each candidate bounding box is represented by a height and a width of the candidate bounding box; and a shape offset of each candidate bounding box comprises height offset and width offset.

8. The method of claim 7, wherein filtering the location offset maps and the shape offset maps of the plurality of candidate bounding boxes by multiplying them with a shape mask of the determined bounding box of the interest object in the previous image frame, to obtain a determined bounding box of the interest object in the current image frame, comprises:
filtering the location offset maps and the shape offset maps of the plurality of candidate bounding boxes by multiplying them with a shape mask of the determined bounding box of the interest object in previous image frame;
selecting one candidate bounding box, whose aspect ratio is most similar to that of the determined bounding box of the interest object in the previous image frame, from the N candidate bounding boxes of the interest object in the current image frame; and
determining the selected one candidate bounding box as the determined bounding box of the interest object in the current image frame.

9. The method of claim 7, wherein filtering the location offset maps and the shape offset maps of the plurality of candidate bounding boxes by multiplying them with a shape mask of the determined bounding box of the interest object in the previous image frame, to obtain the determined bounding box of the interest object in the current image frame, comprises:
filtering the location offset maps and the shape offset maps of the candidate bounding boxes by multiplying them with a shape mask of the determined bounding box of the interest object in previous image frame;
selecting one candidate bounding box, whose location offset or shape offset is the least, from the N candidate bounding boxes of the interest object in the current image frame; and
determining the selected one candidate bounding box as the determined bounding box of the interest object in the current image frame.

10. The method of claim 1, wherein obtaining a regression map based on the backbone feature map, comprises:
inputting the backbone feature map to N computing templates corresponding to the interest object, to obtain the regression map, wherein N is a positive integer greater than 1; each one of the computing templates has been previously trained to indicate a shape of a bounding box of the interest object; and
wherein determining N candidate bounding boxes based on the regression map, comprises:
determining N candidate bounding boxes based on the regression map via the N computing templates, wherein one candidate bounding box is generated by one corresponding computing template.

11. The method of claim 10, wherein the N candidate bounding boxes generated by the N computing templates are in different sizes and/or different aspect ratios.

12. The method of claim 1, wherein the plurality of candidate bounding boxes are filtered, under a temporal coherency constraint, based on the determined bounding box of the interest object in the previous image frame; the temporal coherency constraint means that a distance between a position of the interest object in the previous image frame and a position of the interest object in the current image frame is less than a distance threshold.

13. The method of claim 1, further comprising:
extracting keypoint features of the interest object enclosed by the determined bounding box of the interest object in the current image frame; and
determining a pose of the interest object in the current image frame based on the keypoint features.

14. The method of claim 1, further comprising:
extracting keypoint features of the interest object enclosed by the determined bounding box of the interest object in the current image frame; and
obtaining, a position of the interest object in the determined bounding box of the interest object in the current image frame, based on the keypoint features.

15. The method of claim 1, further comprising:
obtaining the current image frame comprising the interest object, via a time-of light camera or a dynamic vision sensor camera; the current image frame is a depth image.

16. An object detection system, comprising a processor and a memory; wherein the memory stores at least one instruction, and the at least one instruction is loaded and executed by the processor to perform an object detection method, the object detection method comprises:
obtaining a current image frame comprising an interest object, obtaining backbone features of the interest object in the current image frame, and generating, based on the backbone features of the interest object, a backbone feature map of the interest object in the current image frame, wherein the backbone features of the interest object in the current image frame define an outer contour of the interest object;
obtaining a plurality of candidate bounding boxes of the interest object in the current image frame, based on the backbone feature map, comprising:
obtaining a regression map based on the backbone feature map; and
determining N candidate bounding boxes based on the regression map, wherein N is an integer greater than 1; the regression map comprises a bounding box confidence map, N location offset maps, and N shape offset maps; each of the N location offset maps indicates a location offset between a center of each candidate bounding box and a center of a ground truth box corresponding to the interest object; and each of the N shape offset maps indicates a shape offset between each candidate bounding box and the ground truth box; and
filtering the plurality of candidate bounding boxes based on a determined bounding box of the interest object in a previous image frame, to obtain a determined bounding box of the interest object in the current image frame.

17. The system of claim 16, wherein filtering the plurality of candidate bounding boxes based on the determined bounding box of the interest object in the previous image frame, to obtain a determined bounding box of the interest object in the current image frame, comprises:
filtering the bounding box confidence map of the plurality of candidate bounding boxes by multiplying it with a confidence mask of the determined bounding box of the interest object in the previous image frame, to obtain the determined bounding box of the interest object in the current image frame; or
filtering the location offset maps and the shape offset maps of the plurality of candidate bounding boxes by multiplying them with a shape mask of the determined bounding box of the interest object in the previous image frame, to obtain the determined bounding box of the interest object in the current image frame.

18. A non-transitory computer-readable medium storing instructions thereon, wherein the instructions, when being executed by a processor, cause the processor to implement an object detection method comprising:
obtaining backbone features of an interest object comprised in a current image frame, wherein the backbone features of the interest object in the current image frame define an outer contour of the interest object;
generating, based on the backbone features of the interest object, a backbone feature map of the interest object in the current image frame;
obtaining a plurality of candidate bounding boxes of the interest object in the current image frame, based on the backbone feature map, comprising:
obtaining a regression map based on the backbone feature map; and
determining N candidate bounding boxes based on the regression map, wherein N is an integer greater than 1; the regression map comprises a bounding box confidence map, N location offset maps, and N shape offset maps; each of the N location offset maps indicates a location offset between a center of each candidate bounding box and a center of a ground truth box corresponding to the interest object; and each of the N shape offset maps indicates a shape offset between each candidate bounding box and the ground truth box; and
filtering the plurality of candidate bounding boxes based on a determined bounding box of the interest object in a previous image frame, to obtain a determined bounding box of the interest object in the current image frame.

\* \* \* \* \*